United States Patent
Obee et al.

(10) Patent No.: US 7,291,315 B2
(45) Date of Patent: Nov. 6, 2007

(54) SYSTEM TO ENHANCE THE PHOTOCATALYTIC OXIDATION RATE OF CONTAMINANTS THROUGH SELECTIVE DESORPTION OF WATER UTILIZING MICROWAVES

(75) Inventors: Timothy N. Obee, South Windsor, CT (US); Stephen O. Hay, South Windsor, CT (US)

(73) Assignee: Carrier Corporation, Syracuse, NY (US)

( * ) Notice: Subject to any disclaimer, the term of this patent is extended or adjusted under 35 U.S.C. 154(b) by 803 days.

(21) Appl. No.: 10/671,046

(22) Filed: Sep. 25, 2003

(65) Prior Publication Data
US 2005/0069471 A1   Mar. 31, 2005

(51) Int. Cl.
*B01J 19/08*   (2006.01)
(52) U.S. Cl. .................... 422/186.3; 422/121
(58) Field of Classification Search ............. 422/186.3, 422/121
See application file for complete search history.

(56) References Cited

U.S. PATENT DOCUMENTS 5,835,840 A   11/1998   Goswami

FOREIGN PATENT DOCUMENTS

| EP | 0 798 143 A | 10/1997 |
|---|---|---|
| JP | 10 137330 A | 8/1998 |
| JP | 2002 292235 A | 2/2003 |

OTHER PUBLICATIONS

PCT International Search Report, dated Dec. 16, 2004.

*Primary Examiner*—Kishor Mayekar
(74) *Attorney, Agent, or Firm*—Carlson, Gaskey & Olds

(57) ABSTRACT

A photocatalytic coating oxidizes volatile organic compounds that adsorb onto the coating into water, carbon dioxide, and other substances. When photons of the ultraviolet light are absorbed by the coating, reactive hydroxyl radicals are formed. When a contaminant is adsorbed onto the coating, the hydroxyl radical oxidizes the contaminant to produce water, carbon dioxide, and other substances. A humidity sensor or a temperature sensor detects the humidity or temperature, respectively, of the air entering the air purification system. Information about the optimal microwave wavelength and intensity for various humidity and temperature levels are stored in a control of a microwave actuator. The microwave actuator determines the optimal wavelength or intensity based on the sensed humidity and temperature level and sends a signal to a magnetron to emit a microwave of the desired wavelength or intensity. The microwaves are only absorbed by the water, desorbing the water from the photocatalytic coating and creating additional photooxidation sites for the contaminants.

17 Claims, 1 Drawing Sheet

SYSTEM TO ENHANCE THE PHOTOCATALYTIC OXIDATION RATE OF CONTAMINANTS THROUGH SELECTIVE DESORPTION OF WATER UTILIZING MICROWAVES

BACKGROUND OF THE INVENTION

The present invention relates generally to an air purification system that determines the optimal wavelength of microwaves that are emitted to desorb water based on the humidity level or temperature of air in the air purification system.

Indoor air can include trace amounts of contaminants, including carbon monoxide and volatile organic compounds such as formaldehyde, toluene, propanal, butene, and acetaldehyde. Absorbent air filters, such as activated carbon, have been employed to remove these contaminants from the air. As air flows through the filter, the filter blocks the passage of the contaminants, allowing contaminant free air to flow from the filter. A drawback to employing filters is that they simply block the passage of contaminants and do not destroy them.

Titanium dioxide has been employed as a photocatalyst in an air purifier to destroy contaminants. When the titanium dioxide is illuminated with ultraviolet light, photons are absorbed by the titanium dioxide, promoting an electron from the valence band to the conduction band, thus producing a hole in the valence band and adding an electron in the conduction band. The promoted electron reacts with oxygen, and the hole remaining in the valence band reacts with water, forming reactive hydroxyl radicals. When a contaminant adsorbs onto the titanium dioxide photocatalyst, the hydroxyl radicals attack and oxidize the contaminants to water, carbon dioxide, and other substances.

Water and contaminants compete for adsorption sites on the photocatalyst. As there is a much greater concentration of water than contaminants, water has a greater probability of occupying a given adsorption site on the photocatalyst. For example, there are thousands of ppmv for water vapor and much less than one ppmv for a contaminant. Additionally, water forms hydrogen bonds on the photocatalyst that are much stronger than the van der Waals forces that retain a contaminant on the photocatalyst. Water that adsorbs onto the photocatalyst blocks access of the contaminants to the photooxidation sites on the photocatalyst, inhibiting photooxidation of the contaminants.

Photocatalytic activity of the photocatalyst is maximized at about 5 to 30% relative humidity, most preferably at 15% relative humidity. As humidity increases from this range, there is a steep decrease in the photocatalytic rate. For example, at a relative humidity of 60%, the photocatalytic rate decreases by a factor of two.

Microwaves can be employed to maintain an optimal photooxidation rate of the contaminants in a humid atmosphere. Microwaves selectively desorb water molecules from the photocatalyst, freeing the photooxidation sites so they can absorb contaminants. However, different wavelengths and intensities of microwaves are effective at different humidity or temperature levels. Therefore, the optimal wavelength or intensity of microwaves can change as the humidity or temperature level changes.

Hence, there is a need in the art for a system that determines the optimal wavelength or intensity of microwaves to desorb water based on the humidity or temperature level in the air purification system.

SUMMARY OF THE INVENTION

A fan draws air into an air purification system. The air flows through an open passage or channel of a honeycomb. The surface of the honeycomb is coated with a titanium dioxide photocatalytic coating. An ultraviolet light source positioned between successive honeycombs activates the titanium dioxide coating.

When photons of the ultraviolet light are absorbed by the titanium dioxide coating, an electron is promoted from the valence band to the conduction band, producing a hole in the valence band. The electrons in the conduction band are captured by oxygen. The holes in the valence band react with water that is adsorbed on the titanium dioxide coating, forming reactive hydroxyl radicals. When a contaminant, such as a volatile organic compound, is adsorbed onto the titanium dioxide coating, the hydroxyl radical attacks the contaminant, abstracting a hydrogen atom from the contaminant and oxidizing the volatile organic compounds to water, carbon dioxide, and other substances.

A magnetron emits microwaves that desorb water absorbed onto the photocatalytic coating. Different wavelengths and intensities of microwaves are effective at different humidity or temperature levels, and the optimal wavelength or intensity of microwaves changes as the humidity or temperature level changes. The light source, the honeycomb with the photocatalytic coating, and the magnetron are located between opposing wire screens. A microwave cavity is defined by wire screens that form a surrounding enclosure.

A humidity sensor detects the humidity of the air entering the air purification system. Information about the optimal microwave wavelength and intensity for various humidity or temperature levels are stored in a memory of a microwave actuator. Based on the humidity or temperature level, the microwave actuator determines the optimal microwave wavelength or intensity. The microwave actuator sends a signal to the magnetron to emit a microwave of the desired wavelength or intensity. The microwaves are only absorbed by the water, desorbing the water from the photocatalytic coating and creating additional photooxidation sites for the contaminants.

The air purification system also includes a contaminant sensor that senses the contaminant level after the airflow passes through the honeycombs. If the contaminant sensor detects an increase in level of contaminants in the air, the contaminant sensor sends a signal to the microwave actuator to adjust the wavelength or intensity of microwaves emitted from the magnetron until the level of contaminants decreases.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
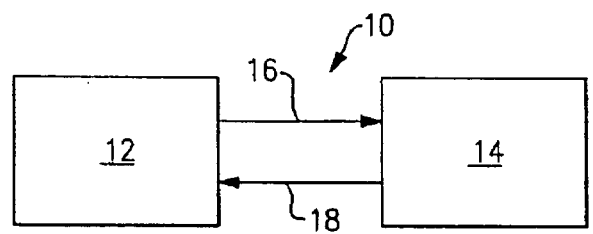
FIG. 1 schematically illustrates an enclosed environment, such as a building, vehicle or other structure, including an interior space and an HVAC system.

FIG. 1 schematically illustrates a building, vehicle, or other structure 10 including an interior space 12, such as a room, an office or a vehicle cabin, such as a car, train, bus or aircraft. An HVAC system 14 heats or cools the interior space 12. Air in the interior space 12 is drawn by a path 16 into the HVAC system 14. The HVAC system 14 changes the temperature of the air drawn 16 from the interior space 12. If the HVAC system 14 is operating in a cooling mode, the air is cooled. Alternately, if the HVAC system 14 is operating in a heating mode, the air is heated. The air is then returned back by a path 18 to the interior space 12, changing the temperature of the air in the interior space 12.

Figure 2:
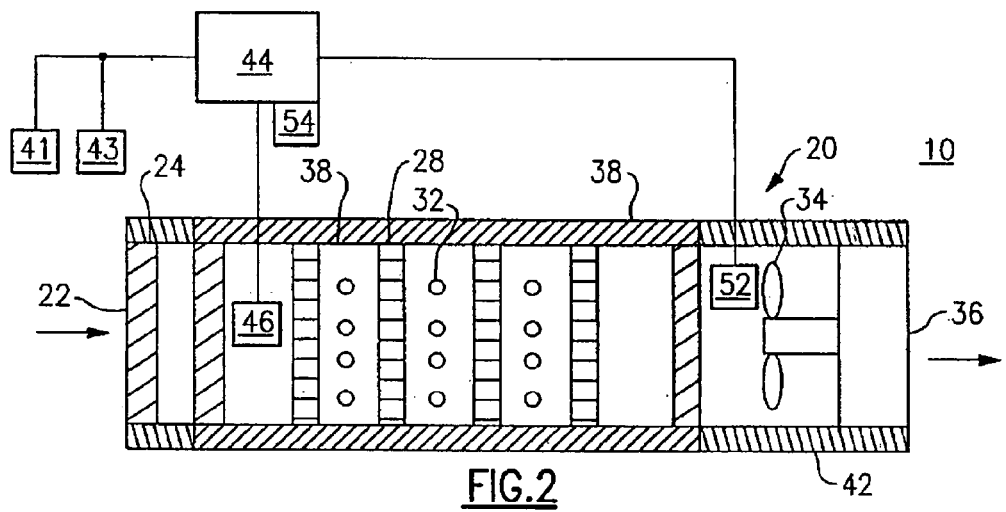
FIG. 2 schematically illustrates the air purification system of the present invention.

FIG. 2 schematically illustrates an air purification system 20 employed to purify the air in the building or vehicle 10 by oxidizing contaminants, such as volatile organic compounds and semi-volatile organic compounds, to water, carbon dioxide, and other substances. The volatile organic compounds can be formaldehyde, toluene, propanal, butene, acetaldehyde, aldehydes, ketones, alcohols, aromatics, alkenes, or alkanes. The air purification system 20 can purify air before it is drawn along path 16 into the HVAC system 14 or it can purify air leaving the HVAC system 14 before it is blown along path 18 into the interior space 12 of the building or vehicle 10. The air purification system 20 can also be a stand alone unit that is not employed with a HVAC system 14.

Figure 3:
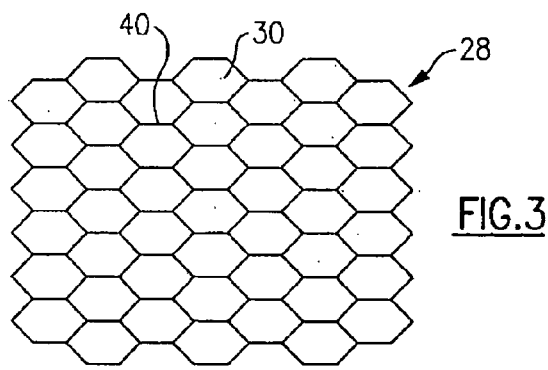
FIG. 3 schematically illustrates the honeycomb of the air purification system.

A fan 34 draws air into the air purification system 20 through an inlet 22. The air flows through a particle filter 24 that filters out dust or any other large particles by blocking the flow of these particles. The air then flows through a substrate 28, such as a honeycomb. FIG. 3 schematically illustrates a front view of the honeycomb 28 having a plurality of hexagonal open passages or channels 30. The surfaces of the plurality of open passages 30 are coated with a titanium dioxide photocatalytic coating 40. When activated by ultraviolet light, the coating 40 oxidizes volatile organic compounds that adsorb onto the titanium dioxide coating 40. As explained below, as air flows through the open passages 30 of the honeycomb 28, contaminants that are adsorbed on the surface of the titanium dioxide coating 40 are oxidized into carbon dioxide, water and other substances.

A light source 32 positioned between successive honeycombs 28 activates the titanium dioxide catalytic coating 40 on the surface of the open passages 30. As shown, the honeycombs 28 and the light source 32 alternate in the air purification system 20. That is, there is a light source 32 located between each of the honeycombs 28. Preferably, the light source 32 is an ultraviolet light source which generates light having a wavelength in the range of 180 nanometers to 400 nanometers. However, the light source 32 can also be an ozone generating lamp.

The light source 32 is illuminated to activate the titanium dioxide coating 40 on the surface of the honeycomb 28. When the photons of the ultraviolet light are absorbed by the titanium dioxide coating 40, an electron is promoted from the valence band to the conduction band, producing a hole in the valence band. The titanium dioxide coating 40 must be in the presence of oxygen and water to oxidize the contaminants into carbon dioxide, water, and other substances. The electrons that are promoted to the conduction band are captured by the oxygen. The holes in the valence band react with water molecules adsorbed on the titanium dioxide coating 40 to form reactive hydroxyl radicals.

When a contaminant is adsorbed onto the coating 40, the hydroxyl radical attacks the contaminant, abstracting a hydrogen atom from the contaminant. In this method, the hydroxyl radical oxidizes the contaminants and produces water, carbon dioxide, and other substances.

Titanium dioxide is an effective photocatalyst to oxide volatile organic compounds to carbon dioxide, water and other substances. When a contaminant is adsorbed onto the titanium dioxide coating 40, the hydroxyl radical attacks the contaminant, abstracting a hydrogen atom from the contaminant. The hydroxyl radical oxidizes the contaminants and produces water, carbon dioxide, and other substances.

Preferably, the photocatalyst is titanium dioxide. In one example, the titanium dioxide is Millennium titania, Degussa P-25, or an equivalent titanium dioxide. However, it is to be understood that other photocatalytic materials or a combination of titanium dioxide with other metal oxides can be employed, as long as they are active supports for photocatalytic function. For example, the photocatalytic materials can be $Fe_2O_3$, $ZnO$, $V_2O_5$, $SnO_2$, or $FeTiO_3$. Additionally, other metal oxides can be mixed with titanium dioxide, such as $Fe_2O_3$, $ZnO$, $V_2O_5$, $SnO_2$, $CuO$, $MnOx$, $WO_3$, $CO_3O_4$, $CeO_2$, $ZrO_2$, $SiO_2$, $Al_2O_3$, $Cr_2O_3$, or $NiO$.

The titanium dioxide can also be loaded with a metal oxide to further improve the photocatalytic effectiveness of the coating 40. In one example, the metal oxide is $WO_3$, $ZnO$, $CdS$, $SrTiO_3$, $Fe_2O_3$, $V_2O_5$, $SnO_2$, $FeTiO_3$, $PbO$, $CO_3O4$, $NiO$, $CeO_2$, $CuO$, $SiO_2$, $Al_2O_3$, $Mn_xO_2$, $Cr_2O_3$, or $ZrO_2$.

Humidity has an effect on the photocatalytic performance of the coating 40. The air purification system 20 further includes a magnetron 46 that emits microwaves that desorb water vapor absorbed onto the photocatalytic coating 40. The photocatalytic performance of the photocatalytic coating 40 is affected by water vapor in air because the water and contaminants compete for adsorption sites on the photocatalyst coating 40. Water vapor that adsorbs onto the photocatalytic coating 40 prevents contaminants from adsorbing on the photocatalytic coating 40. As there is a much greater concentration of water vapor than contaminants, water has a greater probability of occupying a given adsorption site on the photocatalytic coating 40 than a contaminant. Additionally, water forms hydrogen bond on the photocatalytic coating 40 that is much stronger than the van der Waals forces that retain a contaminant on the coating 40. In one example, the air purification system 20 operates at room temperature.

The microwaves emitted by the magnetron 46 selectively desorb water from the adsorption sites on the photocatalytic coating 40, providing the contaminants with an increased number of accessible photooxidation sites and increasing the photooxidation rate. The intensity of the microwaves maintain the photooxidation rate within the optimal range.

The light source 32, the honeycomb 28 with the titanium dioxide coating 40, and the magnetron 46 are located within a microwave cavity 50 defined by wire screens 48 that form a surrounding enclosure. The wire screens 48 prevent microwaves from escaping from the microwave cavity 50. The wire screens 48 also reflect the microwaves within the microwave cavity 50. The openings in the wire screens 48 are smaller than the smallest possible microwaves wavelength to prevent the microwaves from escaping the microwave cavity 50.

The energy of the microwave field is transferred to the adsorbed water, causing the water to leave the surface of the photocatalytic coating 40. The effectiveness of this process depends on the temperature or the humidity level of the air, the microwave field strength, and the microwave wavelength. Sensors can be employed to measure the temperature or humidity. Based on these sensor readings, a microwave actuator 44 sets the intensity or microwave wavelength to achieve the optimal photooxidation rate.

The optimal photooxidation rate of the air purification system 20 is achieved and maintained by an active control strategy. A humidity sensor 41 and a temperature sensor 43 are positioned upstream of the photocatalytic coating 40 detects the humidity or temperature of the air entering the air purification system 20 through the inlet 22. The humidity sensor 41 and the temperature sensor 43 are located outside of the microwave cavity 50 to avoid any undesirable interaction between the microwaves and the humidity sensor 41 and the temperature sensor 43.

Information about the optimal microwave wavelength or intensity for various humidity or temperature levels is stored and programmed in a memory 54 of the microwave actuator 44. That is, for every humidity or temperature level, a corresponding microwave wavelength or intensity is stored in the memory 54. The humidity level detected by the humidity sensor 41 or the temperature level detected by the temperature sensor 43 are sent to the microwave actuator 44. Based on the humidity and temperature level and the information stored in the memory 54, the microwave actuator 44 determines the optimal microwave wavelength or intensity. The microwave actuator 44 sends a signal to the magnetron 46 in the microwave cavity 50 to emit a microwave of the desired wavelength or intensity.

The magnetron 46 emits microwaves having a wavelength that are absorbed by the adsorbed water molecules and not adsorbed by the photocatalytic coating 40, the honeycomb 28, the contaminants, or any other material in the air purification system 20. As the microwaves are only absorbed by the water, the water is desorbed from the photocatalytic coating 40, creating additional photooxidation sites for the contaminants. Therefore, humidity does not effect the photocatalytic coating 40, and the photocatalytic coating 40 can operate at an optimal oxidation rate two or more times greater than the oxidation rate of a system subject to humidity.

The air purification system 20 also include a contaminant sensor 52 that senses the amount of contaminants in the airflow leaving through the honeycomb 28, and therefore the performance of the air purification system 20. The contaminant sensor 52 is in communication with the microwave actuator 44. If the contaminant sensor 52 detects an increase in level of contaminants in the air exiting the honeycombs 28, the performance of the air purification system 20 decreases. The contaminant sensor 52 sends a signal to the microwave actuator 44 to adjust the wavelength or intensity of microwaves emitted from the magnetron 46. The microwave actuator 44 continually changes the wavelength or intensity of the microwaves until the contaminant sensor 52 detects that the performance of the air purification system 20 has improved. Once the contaminant sensor 52 detects that the an optimal performance of the air purification system 20 has been obtained, the microwave actuator 44 sends a signal to the magnetron 46 to continue emitting microwaves of the wavelength or intensity that generate the optimal performance. In one example, the contaminant sensor 52 is located downstream in the air purification system 20. Alternately, the contaminant sensor 52 is positioned both upstream and downstream in the air purification system 20 and a differential of a contaminant level is taken.

Although it is has been illustrated and described that the humidity sensor 41 and the temperature sensor 43 are positioned upstream of the photocatalytic coating 40, it is to be understood that the humidity sensor 41 and the temperature sensor 43 can be positioned downstream of the photocatalytic coating 40. Additionally, although microwaves have been illustrated and described, it is to be understood that radiowaves can be employed.

Reducing the effect of humidity on the photocatalytic coating 40 increases the efficiency of the air purification system 20. Therefore, the air purification system 20 can be made smaller, providing a cost savings.

After passing through the honeycombs 28, the purified air then exits the air purifier through an outlet 36. The walls 38 of the air purification system 20 are preferably lined with a reflective material 42. The reflective material 42 reflects the ultraviolet light onto the surface of the open passages 30 of the honeycomb 28.

Although a honeycomb 28 has been illustrated and described, it is to be understood that the titanium dioxide coating 40 can be applied on any structure. The voids in a honeycomb 28 are typically hexagonal in shape, but it is to be understood that other void shapes can be employed. As contaminants adsorb onto the titanium dioxide coating 40 of the structure in the presence of a light source, the contaminants are oxidized into water, carbon dioxide and other substances.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air purification system comprising:
   a substrate; and
   a photocatalytic coating applied on said substrate;
   a control including memory that stores information correlating one of a level of humidity and a level of temperature to one of a wavelength of energy and an intensity of energy;
   one of a humidity sensor to detect a current level of humidity and a temperature sensor to detect a current temperature; and
   an energy source to generate one of a desired wavelength of said energy and a desired intensity of energy based on one of said current level of humidity and said current level of temperature and said information stored in said control to desorb water that adsorbs on said photocatalytic coating.

2. The air purification system as recited in claim 1 wherein said energy source is microwaves.

3. The air purification system as recited in claim 1 wherein said energy source is radiowaves.

4. The air purification system as recited in claim 1 wherein said photocatalytic coating is titanium dioxide.

5. The air purification system as recited in claim 1 further including further including a surrounding enclosure defined by porous screens defining an energy cavity, and said substrate, said photocatalytic coating, and said light source are located in said energy cavity.

6. The air purification system as recited in claim 5 wherein said one of said humidity sensor and said temperature sensor is located outside of said energy cavity.

7. The air purification system as recited in claim 1 wherein said one of said humidity sensor and said temperature sensor detects one of said current level of humidity and said current level of temperature of air entering said air purification system.

8. The air purification system as recited in claim 1 wherein said one of said desired wavelength and said desired intensity of energy changes as said one of said current level of humidity changes and said current level of temperature changes.

9. The air purification system as recited in claim 1 wherein said desired wavelength of energy is absorbed by said adsorbed water and not absorbed by said photocatalytic coating and said substrate.

10. The air purification system as recited in claim 1 further including a contaminant sensor that senses a level of contaminants.

11. The air purification system as recited in claim 10 wherein said contaminant sensor sends said level of contaminants to said control to adjust said one of said desired wavelength of energy and said intensity of energy.

12. The air purification system as recited in claim 1 further including a light source to activate said photocatalytic coating, and said photocatalytic coating oxidizes contaminants that are adsorbed onto said photocatalytic coating when activated by said light source.

13. The air purification system as recited in claim 12 wherein said light source is an ultraviolet light source.

14. The air purification system as recited in claim 12 wherein photons from said light source are absorbed by said photocatalytic coating to form a reactive hydroxyl radical that oxidizes contaminants in the presence of oxygen and water to water and carbon dioxide.

15. The air purification system as recited in claim 12 wherein said contaminants are one of a volatile organic compound and a semi-volatile organic compound including at least one of formaldehyde, toluene, propanal, butene, acetaldehyde, aldehyde, ketone, alcohol, aromatic, alkene, and alkane.

16. The air purification system as recited in claim 1 further including a metal oxide on said photocatalytic coating, and said metal oxide is at least one of $WO_3$, $ZnO$, $CdS$, $SrTiO_3$, $Fe_2O_3$, $V_2O_5$, $SnO_2$, $FeTiO_3$, $PbO$, $CO_3O4$, $NiO$, $CeO_2$, $CuO$, $SiO_2$, $Al_2O_3$, $Cr_2O_3$, and $ZrO_2$.

17. The air purification system as recited in claim 1 wherein said substrate is an array of voids separated by a solid.

* * * * *

UNITED STATES PATENT AND TRADEMARK OFFICE
CERTIFICATE OF CORRECTION

PATENT NO. : 7,291,315 B2 Page 1 of 1
APPLICATION NO. : 10/671046
DATED : November 6, 2007
INVENTOR(S) : Obee et al.

It is certified that error appears in the above-identified patent and that said Letters Patent is hereby corrected as shown below:

Claim 16, Column 8, line 21:
"$CO_3O4$" should read as --$Co_3O4$--

Signed and Sealed this

Eighteenth Day of March, 2008

JON W. DUDAS
*Director of the United States Patent and Trademark Office*